US010170079B2

(12) United States Patent
Kim et al.

(10) Patent No.: US 10,170,079 B2
(45) Date of Patent: Jan. 1, 2019

(54) DISPLAY APPARATUS AND DISPLAY PANEL DRIVING METHOD THEREOF

(71) Applicant: SAMSUNG ELECTRONICS CO., LTD., Suwon-si (KR)

(72) Inventors: Bong-joe Kim, Seoul (KR); Kyu-ha Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 147 days.

(21) Appl. No.: 15/211,065

(22) Filed: Jul. 15, 2016

(65) Prior Publication Data

US 2017/0061925 A1 Mar. 2, 2017

(30) Foreign Application Priority Data

Aug. 28, 2015 (KR) ........................ 10-2015-0121565

(51) Int. Cl.

| | |
|---|---|
| ***H04N 1/60*** | (2006.01) |
| ***H04N 9/64*** | (2006.01) |
| ***H04N 9/77*** | (2006.01) |
| ***H04N 1/54*** | (2006.01) |
| ***G09G 5/02*** | (2006.01) |
| ***G09G 3/20*** | (2006.01) |

(52) U.S. Cl.

CPC ........... *G09G 5/026* (2013.01); *G09G 3/2074* (2013.01); *G09G 2300/0452* (2013.01); *G09G 2340/0457* (2013.01); *G09G 2340/06* (2013.01)

(58) Field of Classification Search

CPC combination set(s) only.
See application file for complete search history.

(56) References Cited

U.S. PATENT DOCUMENTS 7,319,483 B2 * 1/2008 Park ........................ H04N 9/735 348/223.1
7,417,671 B2 * 8/2008 Sugimori ............. H04N 1/6011 348/223.1
7,522,172 B2 4/2009 Tanase et al.
7,990,393 B2 * 8/2011 Higgins ............... G09G 3/2003 345/589
8,111,301 B2 * 2/2012 Kim ........................ H04N 9/735 348/223.1
8,232,944 B2 7/2012 Takada et al.
8,314,761 B2 11/2012 Takada et al.
8,442,315 B2 * 5/2013 Umeda .................. H04N 9/643 382/167

(Continued)

FOREIGN PATENT DOCUMENTS

JP 2006-330237 A 12/2006
JP 2009-192887 A 8/2009

(Continued)

*Primary Examiner* — Wesner Sajous
(74) *Attorney, Agent, or Firm* — Sughrue Mion, PLLC

(57) ABSTRACT

A method of driving a display panel including a plurality of pixels including a red (R), green (G), blue (B), and white (W) sub-pixels is provided. The method includes receiving image data, converting RGB data included in the image data into RGBW data, and driving the display panel based on the converted RGBW data. The converting includes converting the RGB data into YCbCr data and determining a W value of the RGBW data based on a Y value of the converted YCbCr data.

15 Claims, 6 Drawing Sheets

(56) References Cited

U.S. PATENT DOCUMENTS

| | | | | |
|---|---|---|---|---|
| 8,928,685 | B2 * | 1/2015 | Kim | G09G 5/02 345/590 |
| 9,171,513 | B2 * | 10/2015 | Kim | G09G 3/3648 |
| 2006/0268003 | A1 | 11/2006 | Tanase et al. | |
| 2009/0207182 | A1 | 8/2009 | Takada et al. | |
| 2012/0249613 | A1 | 10/2012 | Takada et al. | |
| 2012/0257821 | A1 | 10/2012 | Saito et al. | |
| 2012/0268353 | A1 | 10/2012 | Mizukoshi et al. | |
| 2013/0076803 | A1 * | 3/2013 | Lee | G09G 3/3233 345/690 |
| 2014/0333683 | A1 | 11/2014 | Qi et al. | |
| 2015/0271460 | A1 * | 9/2015 | Jung | H04N 9/735 348/225.1 |
| 2015/0304648 | A1 * | 10/2015 | Gulati | H04N 17/002 348/175 |

FOREIGN PATENT DOCUMENTS

| | | | |
|---|---|---|---|
| JP | 2011-64959 | A | 3/2011 |
| JP | 2011-100143 | A | 5/2011 |
| KR | 10-2013-0030598 | A | 3/2013 |
| KR | 10-2013-0060476 | A | 6/2013 |
| KR | 10-2014-0122119 | A | 10/2014 |
| KR | 10-2015-0012693 | A | 2/2015 |

* cited by examiner

DISPLAY APPARATUS AND DISPLAY PANEL DRIVING METHOD THEREOF

CROSS-REFERENCE TO RELATED APPLICATION

This application claims priority from Korean Patent Application No. 10-2015-0121565, filed on Aug. 28, 2015, in the Korean Intellectual Property Office, the disclosure of which is incorporated herein by reference in its entirety.

BACKGROUND

Field

Apparatuses and methods consistent with the present disclosure relate to a display apparatus and a display panel driving method thereof, and more particularly, to a display apparatus that drives a display panel including a plurality of color pixels, and a display panel driving method thereof.

Description of the Related Art

Due to the development of electronic technology, various types of display apparatuses have been developed and propagated.

In general, most display apparatuses use three primary colors (i.e., red, green, blue (RGB) colors) as main colors but have a limit in expressing a wide color gamut merely with the three primary colors.

Therefore, four-primary color display apparatuses have appeared and have further added white pixels to use red, green, blue, white (RGBW) as main colors. The four-primary display apparatuses have expressed an extended color gamut and thus have received attentions.

A four-primary color display apparatus requires an operation of converting an RGB image into an RGBW image and acquires a white pixel value based on RGB minimum and maximum values for the operation.

However, according to an existing method described above, a white pixel value is linearly acquired, and thus a visual recognition characteristic of a human is not sufficiently considered. Also, when converting an RGB image into an RGBW image, intensities of RGB pixels decrease in terms of hardware, and thus color purities of RGBW decreases.

SUMMARY

Exemplary embodiments of the present disclosure overcome the above disadvantages and other disadvantages not described above. Also, the present disclosure is not required to overcome the disadvantages described above, and an exemplary embodiment of the present disclosure may not overcome any of the problems described above.

The present disclosure provides a display apparatus that drives a display panel including a plurality of color pixels, and a display panel driving method thereof.

According to an aspect of the present disclosure, a method of driving a display panel including a plurality of pixels including red (R), green (G), blue (B), and white (W) sub-pixels, includes receiving image data, converting RGB data included in the image data into RGBW data, and driving the display panel based on the converted RGBW data. The converting may include converting the RGB data into YCbCr data and determining W value of the RGBW data based on Y value of the converted YCbCr data.

The converting the RGB data into the RGBW data may include determining RGB values of the RGBW data based on the converted YCbCr data.

The determining may include determining a value, which is calculated by applying the Y value of the converted YCbCr data to a pre-designated contrast enhancement algorithm, as the W value.

The pre-designated contrast enhancement algorithm may include a histogram equalization or a sigmoid function.

The determining the RGB values may include calculating $YCb_{out}Cr_{out}$ data by applying weights to Cb value and Cr value of the converted YCbCr data and determining RGB values of the RGBW data based on the calculated $YCb_{out}Cr_{out}$ data.

$Cb_{out}$ and $Cr_{out}$ values of the $YCb_{out}Cr_{out}$ data may be calculated through Equation below:

$$Cb_{out}=(1-G)Cb_{in}+G\cdot Cb_{max}$$

$$Cr_{out}=(1-G)Cr_{in}+G\cdot Cr_{max}$$

wherein, G denotes a weight calculated through a monotone enhancement function, $Cb_{max}$ denotes a product of Cb value of the converted YCbCr data and constant k, and $Cr_{max}$ denotes a product of Cr value of the converted YCbCr data and the constant k.

The G may be calculated through Equation below:

$$G=(Cb_{in}^2+Cr_{in}^2)/(Cb_{max}^2+Cr_{max}^2)$$

wherein $Cb_{in}$ denotes Cb value of the converted YCbCr data, and $Cr_{in}$ denotes Cr value of the converted YCbCr data.

The constant k may be calculated through Equation below:

$$\operatorname{argmax}_k \begin{bmatrix} R_0 \\ G_0 \\ B_0 \end{bmatrix} = \begin{bmatrix} 1 & 0 & 1.402 \\ 1 & -0.344 & -0.714 \\ 1 & 1.722 & 0 \end{bmatrix} \begin{bmatrix} Y_{in} \\ k\times Cb_{in} \\ k\times Cr_{in} \end{bmatrix}$$

$$\text{s.t.} \begin{cases} 0 \le R_0,\ G_0,\ B_0 \le 255 \\ 1 \le k \end{cases}$$

wherein $Y_{in}$ denotes Y value of the converted YCbCr data

According to another aspect of the present disclosure, a display apparatus including a display panel including a plurality of pixels including R, G, B, and W sub-pixels, includes an image receiver configured to receive image data, and a controller configured to convert RGB data included in the image data into RGBW data and drive the display panel based on the converted RGBW data. The controller may convert the RGB data into YCbCr data and determine W value of the RGBW data based on Y value of the converted YCbCr data.

The controller may determine RGB values of the RGBW data based on the converted YCbCr data.

The controller may determine a value, which is calculated by applying Y value of the converted YCbCr data to a pre-designated contrast enhancement algorithm, as the W value.

The pre-designated contrast enhancement algorithm may include a histogram equalization or a sigmoid function.

The controller may calculate $YCb_{out}Cr_{out}$ data by applying weights to Cb value and Cr value of the converted YCbCr data and determine RGB values of the RGBW data based on the calculated $YCb_{out}Cr_{out}$ data.

$Cb_{out}$ and $Cr_{out}$ values of the $YCb_{out}Cr_{out}$ may be calculated through Equation below:

$$Cb_{out}=(1-G)Cb_{in}+G\cdot Cb_{max}$$

$$C_{out}=(1-G)Cr_{in}+G\cdot Cr_{max}$$

wherein, G denotes a weight calculated through a monotone enhancement function, $Cb_{max}$ denotes a product of Cb value of the converted YCbCr data and constant k, and $Cr_{max}$ denotes a product of Cr value of the converted YCbCr data and the constant k.

The G may be calculated through Equation below:

$$G=(Cb_{in}^2+Cr_{in}^2)/(Cb_{max}^2+Cr_{max}^2)$$

wherein $Cb_{in}$ denotes Cb value of the converted YCbCr data, and $Cr_{in}$ denotes Cr value of the converted YCbCr data.

The constant k may be calculated through Equation below:

$$\text{argmax}_k \begin{bmatrix} R_0 \\ G_0 \\ B_0 \end{bmatrix} = \begin{bmatrix} 1 & 0 & 1.402 \\ 1 & -0.344 & -0.714 \\ 1 & 1.722 & 0 \end{bmatrix} \begin{bmatrix} Y_{in} \\ k \times Cb_{in} \\ k \times Cr_{in} \end{bmatrix}$$

$$\text{s.t.} \begin{cases} 0 \le R_0, G_0, B_0 \le 255 \\ 1 \le k \end{cases}$$

wherein $Y_{in}$ denotes Y value of the converted YCbCr data.

According to another aspect of the present disclosure, a non-transitory computer readable recording medium storing a program for performing a method of driving a display panel including a plurality of pixels including R, G, B, and W sub-pixels. The method may include receiving image data, converting RGB data included in the image data into RGBW data, and driving the display panel based on the converted RGBW data. The converting may include converting the RGB data into YCbCr data and determining W value of the RGBW data based on Y value of the converted YCbCr data.

Additional and/or other aspects and advantages of the present disclosure will be set forth in part in the description which follows and, in part, will be obvious from the description, or may be learned by practice of the present disclosure.

BRIEF DESCRIPTION OF THE DRAWINGS

The above and/or other aspects of the present disclosure will be more apparent by describing certain exemplary embodiments of the present disclosure with reference to the accompanying drawings, in which.

DETAILED DESCRIPTION OF EXEMPLARY EMBODIMENTS

The present exemplary embodiments may be variously modified and have several forms. Therefore, specific exemplary embodiments of the present disclosure will be illustrated in the accompanying drawings and be described in detail in the present specification. However, it is to be understood that the present disclosure is not limited to a specific exemplary embodiment, but includes all modifications, equivalents, and substitutions without departing from the scope and spirit of the present disclosure. When it is decided that the detailed description of the known art related to the present disclosure may obscure the gist of the present disclosure, a detailed description therefor will be omitted.

Terms 'first', 'second', and the like, may be used to describe various components, but the components are not to be construed as being limited by the terms. The terms are used to distinguish one component from another component.

Terms used in the present specification are used only in order to describe specific exemplary embodiments rather than limiting the scope of the present disclosure. Singular forms are intended to include plural forms unless the context clearly indicates otherwise. It will be further understood that the terms "comprises" or "configured of" used in this specification, specify the presence of features, numerals, steps, operations, components, parts mentioned in this specification, or a combination thereof, but do not preclude the presence or addition of one or more other features, numerals, steps, operations, components, parts, or a combination thereof.

In the embodiment of the present disclosure, a 'module' or a 'unit' performs at least one function or operation and may be implemented by hardware or software or a combination of the hardware and the software. Further, a plurality of 'modules' or a plurality of 'units' are integrated into at least one module except for the 'module' or 'unit' which needs to be implemented by specific hardware and thus may be implemented by at least one processor (not illustrated).

Hereinafter, exemplary embodiments will be explained in detail with reference to the accompanying drawings.

Figure 1:
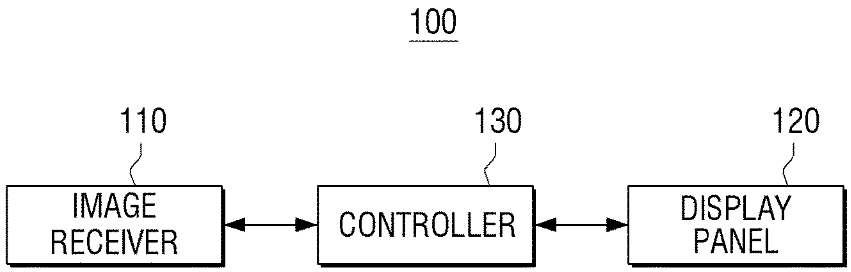
FIG. 1 is a block diagram of a configuration of a display apparatus according to an exemplary embodiment of the present disclosure.

FIG. 1 is a block diagram of a configuration of a display apparatus 100, according to an exemplary embodiment of the present disclosure.

Referring to FIG. 1, the display apparatus 100 includes an image receiver 110, a display panel 120, and a controller 130.

The display apparatus 100 may be realized as a liquid crystal display (LCD), an organic light-emitting diode (OLED), a transparent OLED (TOLED), or the like. The display apparatus 100 may also be realized as various types of electronic devices such as a TV, an electronic bulletin board, an electronic table, a large format display (LFD), a smartphone, a tablet PC, a desktop PC, a notebook computer, etc.

The image receiver 110 receives image data through various types of sources. For example, the image receiver 110 may receive broadcast data from an external broadcasting station or may receive image data from an external source (e.g., a digital video disc (DVD), a Blue-ray disc (BD) player, or the like) according to various types of communication interfaces.

For example, the image receiver 110 may communicate with various types of external sources according to various types of communication protocols. In detail, various types of communication methods, such as Institute of Electrical and Electronics Engineers (IEEE), Wireless Fidelity (WiFi), Bluetooth, 3rd Generation (3G), 4th Generation (4G), Near Field Communication (NFC), etc., may be used.

The display panel 120 may be an LCD panel, an OLED panel, or the like.

The display panel 120 includes a plurality of pixels including red (R), green (G), blue (B), and white (W) sub-pixels. The plurality of pixels including a plurality of sub-pixels may be arranged in rows and columns, and the display panel 120 may display an image with sets of the plurality of pixels arranged in the rows and columns.

The controller 130 is an element for controlling an overall operation of the display apparatus 100.

The controller 130 may control the display panel 120 to respectively turn on the sub-pixels so as to display an image.

In particular, the controller 130 may convert RGB data included in the input image data into RGBW data and drive the display panel 120 based on the converted RGBW data.

In order to convert the RGB data included in the image data into the RGBW data, the controller 130 converts the RGB data included in the image data into YCbCr data. YCbCr is a kind of color space used in an image system. Y is a luminance component, and Cb and Cr are chrominance components.

In detail, the controller 130 converts the RGB data into the RGBW data by using Equation I below.

$$\begin{bmatrix} R \\ G \\ B \end{bmatrix} = \begin{bmatrix} 1 & 0 & 1.402 \\ 1 & -0.344 & -0.714 \\ 1 & 1.772 & 0 \end{bmatrix} \begin{bmatrix} Y \\ Cb \\ Cr \end{bmatrix} \tag{I}$$

The controller 130 may also determine W value of the RGBW data based on Y value of the converted YCbCr data.

In this case, the controller 130 may determine the Y value of the converted YCbCr data as W value of the RGBW data.

Alternatively, in order to enhance a contrast of an image, the controller 130 may convert Y value of each pixel to calculate Y' value based on whole Y distribution of the image and Y value of each pixel and determine the Y' value as the W value of the RGBW data.

For example, the controller 130 may determine a value, which is calculated by applying the Y value of the converted YCbCr data to a contrast enhancement algorithm, as the W value of the RGBW data.

Contrast stretching using a histogram and global or local histogram equalization may be used as the contrast enhancement algorithm.

The contrast stretching is a method of spreading a histogram to expressible minimum and maximum contrasts by using a ratio between the minimum and maximum contrasts.

The histogram equalization is to re-distribute a brightness value of an image by converting a cumulative histogram distribution of the image so as to enhance a contrast of the image. In other words, the histogram equalization may re-adjust brightness values of pixels focused in a particular brightness area and further widely distribute the brightness values to enhance the contrast of the image so as to enhance an image quality.

Examples of the histogram equalization include global histogram equalization and local histogram equalization.

Figure 2:
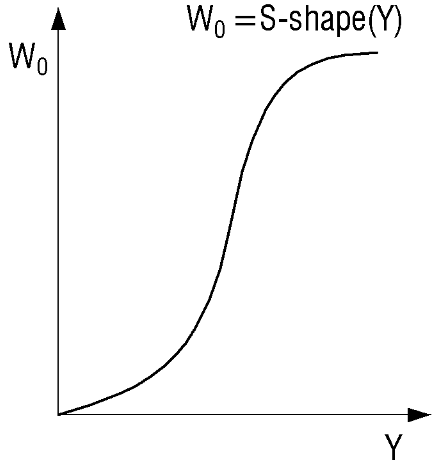
FIG. 2 is a graph illustrating a color conversion method according to an exemplary embodiment of the present disclosure.

Alternatively, a technique that applies Y value to a sigmoid function may be used as the contrast enhancement algorithm. The sigmoid function may be an S-shape function as shown in FIG. 2 as an S-shape continuous function. A form of the S-shape function may be determined based on a brightness value of a whole image, and as shown in FIG. 2, $W_o$ may be calculated by applying the Y value of the converted YCbCr data as a parameter of the sigmoid function and may be determined as W value of RGBW.

According to the above-described exemplary embodiments, the contrast of the image may be enhanced so as to acquire W value of the RGBW data having an enhanced recognition visual intensity by applying the Y value of the YCbCr data to the contrast enhancement algorithm.

When converting the RGB data included in the input image data into the RGBW data, intensities of R, G, and B pixels decrease due to a hardware characteristic of a display apparatus, and thus color purities of RGBW may decrease for the same RGB values.

Figure 3:
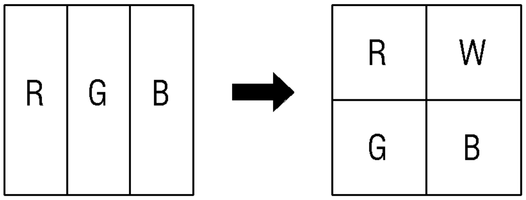
FIG. 3 illustrates sub-pixels according to an exemplary embodiment of the present disclosure.

In other words, as shown in FIG. 3, if a pixel area (i.e., a left area) including RGB sub-pixels is the same as a pixel area (i.e., a right area) including RGBW sub-pixels, each sub-pixel of the pixel area including the RGB sub-pixels occupies ⅓ of the pixel area, and each sub-pixel of the pixel area including the RGBW sub-pixels occupies ¼ of the pixel area. Therefore, color purities of the same RGB values decrease in the pixel area including the RGBW sub-pixels. Therefore, when converting the RGB data into the RGBW data, RGB color purities are required to increase in consideration of this hardware characteristic.

To increase the RGB color purities, the controller 130 may convert the RGB data included in the image data into the YCbCr data and determine RGB values of the RGBW data based on the converted YCbCr data.

In detail, the controller 130 may calculate $YCb_{out}Cr_{out}$ data where weights are applied to Cb and Cr values of the converted YCbCr data and determine RGB values of the RGBW data based on the calculated $YCb_{out}Cr_{out}$ data.

In this case, $Cb_{out}$ and $Cr_{out}$ values of the $YCb_{out}Cr_{out}$ data may be calculated through Equation II below:

$$Cb_{out}=(1-G)Cb_{in}+G\cdot Cb.$$

$$Co_{out}=(1-G)Cr_{in}+G\cdot Cr_{max} \tag{II}$$

wherein G denotes a weight calculated through a monotone enhancement function, $Cb_{max}$ denotes a product of Cb value of the converted YCbCr data and constant k, and $Cr_{max}$ is a product of Cr value of the converted YCbCr data and the constant K. In other words, $k\times Cb_{in}=Cb_{max}$, and $k\times Cr_{in}=Cr_{max}$.

The G value of Equation II may be calculated through a monotone enhancement function of Equation III below.

$$G=(Cb_{in}^2+Cr_{in}^2)/(Cb_{max}^2+Cr_{max}^2) \tag{III}$$

Various types of monotone enhancement functions may be used to acquire G value besides Equation III.

Also, k value is calculated through Equation IV below:

$$\operatorname{argmax}_k \begin{bmatrix} R_0 \\ G_0 \\ B_0 \end{bmatrix} = \begin{bmatrix} 1 & 0 & 1.402 \\ 1 & -0.344 & -0.714 \\ 1 & 1.772 & 0 \end{bmatrix} \begin{bmatrix} Y_{in} \\ k\times Cb_{in} \\ k\times Cr_{in} \end{bmatrix} \tag{IV}$$

$$\text{s.t.} \begin{cases} 0 \le R_0, G_0, B_0 \le 255 \\ 1 \le k \end{cases}$$

wherein $Y_{in}$ denotes Y value of the converted YCbCr data.

Also, the controller 130 converts $Y_{in}$, $Cb_{out}$ and $Cr_{out}$ into RGB values by using Equation I and determines the converted RGB values as RGB values of final RGBW data.

Figure 4:
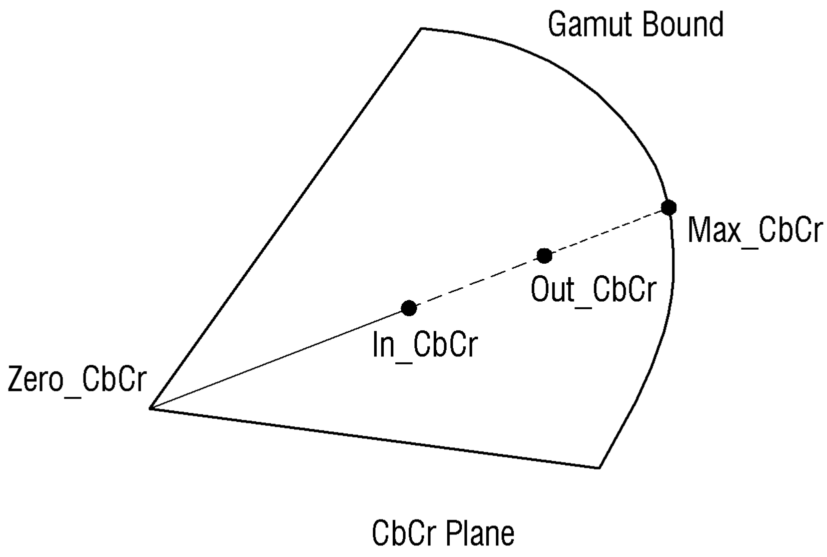
FIG. 4 illustrates a method of enhancing a color purity according to an exemplary embodiment of the present disclosure.

The above result is illustrated in CbCr plane as illustrated in FIG. 4.

FIG. 4 illustrates CbCr plane showing dot In_CbCr on CbCr plane represented with $Cb_{in}$ and $Cr_{in}$ and dot Max_CbCr on CbCr plane represented with $Cb_{max}$ and $Cr_{max}$.

Dot Out_CbCr is illustrated on CbCr plane represented with $Cb_{out}$ and $Cr_{out}$ that are acquired through Equations described above.

As shown in FIG. 4, Out_CbCr takes a value between In_CbCr and Max_CbCr to have the same color (hue) value as In_CbCr and an enhanced color purity.

Therefore, since Out_CbCr has the same color value and the enhanced color purity, there may be solved decreases in intensities of R, G, and B pixels when converting RGB data into RGBW data due to a hardware characteristic of a display apparatus as described with reference to FIG. 3.

According to the above-described exemplary embodiments of the present disclosure, an abundant RGBW color conversion may be performed by enhancing a color impurity without a hue distortion through color processing in YCbCr space. Also, a contrast of an image may be enhanced by analyzing Y value of an input image to output W pixel value appropriate for a visual characteristic of a human.

Figure 5:
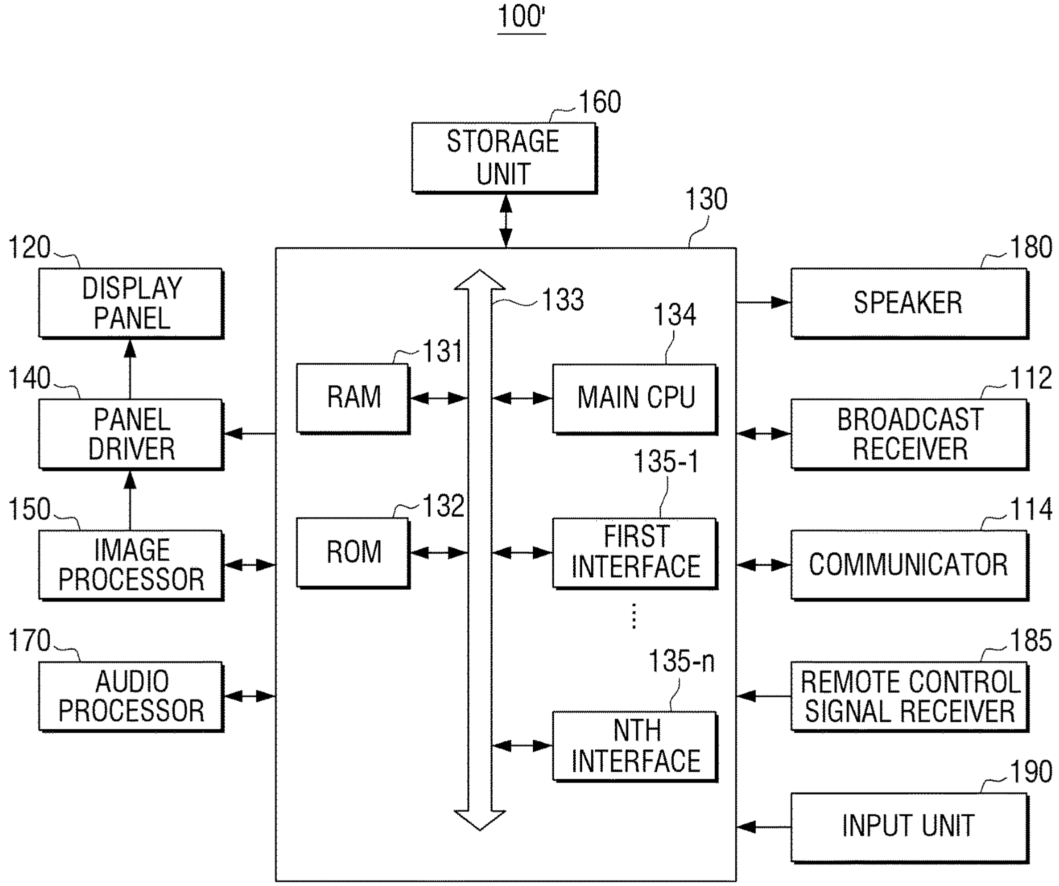
FIG. 5 is a block diagram of a configuration of a display apparatus according to another exemplary embodiment of the present disclosure.

FIG. 5 is a block diagram of a detailed configuration of a display apparatus 100' that is realized as a TV, according to an exemplary embodiment of the present disclosure.

Referring to FIG. 5, the display apparatus 100' includes a display panel 120, a panel driver 140, a controller 130, an image processor 150, a storage unit 160, an audio processor 170, a speaker 180, a broadcast receiver 112, a communicator 114, a remote control signal receiver 185, and an input unit 190.

The display panel 120 includes a pixel including a plurality of sub-pixels of different colors. The display panel 120 turns on a sub-pixel of a corresponding color according to color frame data of image data, i.e., a pixel value. Each pixel of the display panel 120 is realized in a form including R, G, B, and W sub-pixels.

If the display apparatus 100' is an LCD apparatus, the display panel 120 may include a backlight unit including a white light source and a blue light source. The backlight unit provides backlight by sequentially turning on the white light source and the blue light source.

All of a plurality of sub-pixels configuring the display panel 120 may be realized as LEDs. In this case, the backlight unit is not required.

The panel driver 140 turns on a sub-pixel of a color corresponding to each color frame data.

The image processor 150 sequentially provides each generated color frame data to the panel driver 140, and the panel driver 140 drives the display panel 120 to turn on a sub-pixel of a color corresponding to each frame data. In detail, the panel driver 140 drives the display panel 120 to turn on a first color sub-pixel according to first color frame data and a second color sub-pixel according to second color frame data.

The controller 130 controls an overall operation of the display apparatus 100'. In detail, if image data is input, the controller 130 controls the image processor 150 to generate each color frame data.

In particular, if image data including RGB data is input, the controller 130 may control the image processor 150 to convert the RGB data into RGBW data so as to generate each color frame data. A method of converting RGB data into RGBW data has been described above and thus is omitted herein.

The storage unit 160 may store an operating system (O/S) for driving the display apparatus 100', software and firmware for performing various functions, an application, a content, setting information input or set by a user while executing the application, characteristic information indicating a characteristic, etc. of the display apparatus 100', etc.

The controller 130 may control an overall operation of the display apparatus 100' by using various types of programs stored in the storage unit 160.

The controller 130 includes a random access memory (RAM) 131, a read only memory (ROM) 132, a main central processing unit (CPU) 134, various types of interfaces 135-1 through **135-*n*, and a bus 133**.

The RAM 131, the ROM 132, the main CPU 134, the various types of interfaces 135-1 through **135-*n*, etc. may be connected to one another through the bus 133** to transmit and receive various types of data or signals, etc.

The first through $n^{th}$ interfaces 135-1 through **135-*n* may be connected to various types of elements shown in FIG. 5 and other elements so as to enable the main CPU 134 to access the elements. For example, if an external device, such as a universal serial bus (USB) memory, is connected to the display apparatus 100', the main CPU 134** may access the USB memory through a USB interface.

If the display apparatus 100' is connected to an external power source, the main CPU 134 operates in a standby state. If a turn-on command is input through various types of input units such as the remote control signal receiver 185, the input unit 190, etc., in the standby state, the main CPU 134 accesses the storage unit 160 to perform booting by using the O/S stored in the storage unit 160. Also, the main CPU 134 sets various functions of the display apparatus 100' according to user setting information pre-stored in the storage unit 160.

In detail, the ROM 132 stores a command set, etc. for booting a system. If the turn-on command is input, and thus power is supplied, the main CPU 134 copies the O/S stored in the storage unit 160 into the RAM 131 according to a command stored in the ROM 132 and executes the O/S to boot the system. If the system is completely booted, the main CPU 134 copies various types of programs stored in the storage unit 160 into the RAM 131 and executes the programs copied into the RAM 131 to perform various types of operations.

The remote control signal receiver 185 is an element for receiving a remote control signal transmitted from a remote controller. The remote control signal receiver 185 may be realized as a type of a device including a light-receiving unit for receiving an infrared (IR) signal or as a type of a device communicating with a remote controller according to a wireless communication protocol such as Bluetooth or WiFi to receive a remote control signal.

The input unit 190 may be realized as various types of buttons included in a main body of the display apparatus 100'. The user may input various types of user commands, such as a turn-on and/or turn-off command, a channel change command, a volume control command, a menu check command, etc., through the input unit 190.

The broadcast receiver 112 is an element for receiving and processing a broadcast signal by tuning a broadcast channel. The broadcast receiver 112 may include a tuner, a demodulator, an equalizer, a demultiplexer, etc. The broadcast receiver 112 may receive a broadcast signal desired by the user by tuning the broadcast channel, demodulate and equalize the received broadcast signal, and demultiplex the modulated and equalized broadcast signal into video data, audio data, and additional data under control of the controller 130.

The demultiplexed video data is provided to the image processor 150. The image processor 150 generates a frame to be output on a screen by performing various types of image processing, such as noise filtering, frame rate converting, resolution converting, etc., with respect to the provided video data.

The demultiplexed audio data is provided to the audio processor 170. The audio processor 170 may perform various types of processing, such as decoding, amplifying, noise filtering, etc., with respect to the audio data.

Although not shown in FIG. 5, a graphic processor may be further included. The graphic processor forms various types of On Screen Display (OSD) messages or a graphic screen under control of the main CPU 134. If the broadcast signal includes the additional data such as subtitle data, the main CPU 134 may control the graphic processor to generate a subtitle image and map the generated subtitle image on each frame generated by the image processor 170 so as to form a frame.

The speaker 180 is an element for outputting the audio data processed by the audio processor 170. The controller 130 operates along with the display panel 120 to control the speaker 180 so as to synchronize and output the video data and the audio data.

The communicator 114 is an element for communicating with various types of external sources according to various types of communication protocols. For example, various types of communication methods, such as IEEE, WiFi, Bluetooth, 3G, 4G, NFC, etc., may be used. In detail, the communicator 114 may include various types of communication chips such as a WiFi chip, a Bluetooth chip, an NFC chip, a wireless communication chip, etc. The WiFi chip, the Bluetooth chip, the NFC chip, and the wireless communication chip may respectively perform communications according to a WiFi method, a Bluetooth method, and an NFC method. Among these communication chips, the NFC chip refers to a chip that operates according to an NFC method using a band of 13.56 MHz among various radio frequency identification (RFID) frequency bands such as 135 kHz, 13.56 MHz, 433 MHz, 860-960 MHz, 2.45 GHz, etc. If the communicator 114 uses the WiFi chip or the Bluetooth chip, the communicator 114 may transmit and receive various types of connection information such as a subsystem identification (SSID), a session key, etc., connect communications by using the various types of connection information, and transmit and receive various types of information. The wireless communication chip refers to a chip that performs communications according to various types of communication standards such as IEEE, Zigbee, 3G, $3^{rd}$ Generation Partnership Project (3GPP), Long Term Evolution (LTE), etc.

The controller 130 may play the broadcast signal received through the broadcast receiver 112 and image data received from an external source through the communicator 114.

Even if a play command for image data pre-stored in the storage unit 160 is input through the remote control signal receiver 185 or the input unit 190, the controller 130 may control the image processor 150 and the audio processor 170 to process the image data.

If the display apparatus 100' is realized as a multifunction terminal apparatus such as a portable phone, a tablet PC, or the like, various types of elements, such as a camera, a touch sensor, a geomagnetic sensor, a gyro sensor, an acceleration sensor, a global positioning system (GPS) chip, etc., may be further included.

The various exemplary embodiments described above may be embodied in a recording medium read by a computer or a similar device by using software, hardware, or a combination thereof. According to the hardware configuration, the exemplary embodiments of the present disclosure may be embodied by using at least one selected from Application Specific Integrated Circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units for performing other functions. In some cases, the exemplary embodiments of the present disclosure may be realized as the controller 130. According to the software configuration, exemplary embodiments, such as processes and functions described in the present specification, may be embodied as additional software modules. The software modules may perform one or more functions and operations described in the present specification.

Figure 6:
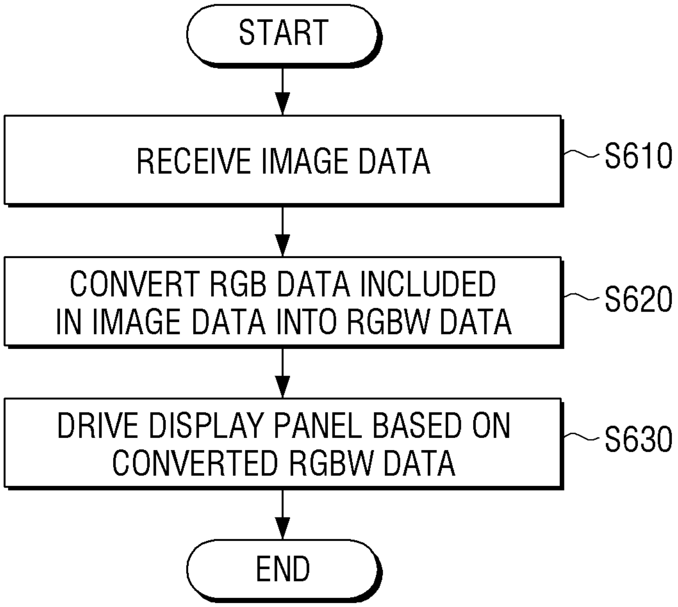
FIG. 6 is a flowchart of a method of driving a display panel according to an exemplary embodiment of the present disclosure.

FIG. 6 is a flowchart of a method of driving a display panel including a plurality of pixels including R, G, B, and W sub-pixels, according to an exemplary embodiment of the present disclosure.

Referring to FIG. 6, in operation S610, image data is received. The image data may be broadcast data received from a broadcasting station or multimedia data received from a DVD, BD player, or the like.

In operation S620, RGB data included in the image data is converted into RGBW data.

In this case, the RGB data may be converted into YCbCr data, and W value of the RGBW data may be determined based on Y value of the converted YCbCr data.

In detail, the Y value of the converted YCbCr data may be determined as the W value of the RGBW data or new Y' value may be calculated and determined as the W value of the RGBW data by applying the Y value of the converted YCbCr data as a parameter of a conversion function.

In this case, the conversion function may be a histogram equalization function or a sigmoid function. Therefore, W value may be determined through the conversion function so as to express a bright part as being brighter and a dark part as being darker, i.e., so as to enhance a contrast effect.

Also, RGB values of the RGBW data may be determined based on the converted YCbCr data.

In detail, $YCb_{out}Cr_{out}$ data may be calculated by applying weights to Cb and Cr values of the converted YCbCr data, and the RGB values of the RGBW data may be determined based on the calculated $YCb_{out}Cr_{out}$ data.

In operation S630, a display panel is driven based on the converted RGBW data. In other words, W pixel value may be determined based on the Y value, and RGB pixel values may be determined based on YCbCr value where a weight is applied to CbCr value, so as to turn on sub-pixels of the display panel according to determined R, G, B, and W values.

According to the above-described exemplary embodiment, color processing may be performed in YCbCr space, and thus a color purity may be enhanced, and an abundant color conversion may be performed without a hue distortion. Also, the W pixel value may be determined based on Y value of each pixel for Y value of a whole image, and thus an image having an enhanced contrast may be acquired.

Methods according to the above-described various exemplary embodiments may be generated as software to be installed in a display apparatus or a system.

In detail, according to an exemplary embodiment of the present disclosure, there may be provided a non-transitory computer readable medium that stores a program performing receiving image data, converting RGB data included in the image data into YCbCr data and determining W value of RGBW data based on Y value of the converted YCbCr data to convert the RGB data into the RGBW data, and driving a display panel based on the converted RGBW data.

The non-transitory computer readable medium is a medium which does not store data temporarily such as a register, cash, and memory but stores data semi-permanently and is readable by devices. More specifically, the aforementioned applications or programs may be stored in the non-transitory computer readable media such as compact disks (CDs), digital video disks (DVDs), hard disks, Blu-ray disks, universal serial buses (USBs), memory cards, and read-only memory (ROM).

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:

1. A method of driving a display panel comprising a plurality of pixels including red (R), green (G), blue (B), and white (W) sub-pixels, the method comprising:

receiving image data;

converting RGB data included in the received image data into RGBW data; and driving the display panel based on the converted RGBW data, wherein the converting comprises converting the RGB data into YCbCr data and obtaining a W value of the RGBW data based on a Y value of the converted YCbCr data, and wherein the W value is the Y value of the converted YCbCr data or a value obtained by applying the Y value to a predetermined contrast enhancement algorithm.

2. The method of claim 1, wherein the converting the RGB data into the RGBW data comprises identifying RGB values of the RGBW data based on the converted YCbCr data.

3. The method of claim 1, wherein the predetermined contrast enhancement algorithm comprises a histogram equalization or a sigmoid function.

4. The method of claim 2, wherein the identifying the RGB values comprises obtaining $YCb_{out}Cr_{out}$ data by applying weights to Cb value and Cr value of the converted YCbCr data and identifying RGB values of the RGBW data based on the calculated $YCb_{out}Cr_{out}$ data.

5. The method of claim 4, wherein $Cb_{out}$ and $Cr_{out}$ values of the $YCb_{out}Cr_{out}$ data are obtained through Equation below:

$$Cb_{out}=(1-G)Cb_{in}+G\cdot Cb_{max}$$

$$Cr_{out}=(1-G)Cr_{in}+G\cdot Cr_{max}$$

wherein, G denotes a weight obtained through a monotone enhancement function, $Cb_{max}$ denotes a product of Cb value of the converted YCbCr data and constant k, and $Cr_{max}$ denotes a product of Cr value of the converted YCbCr data and the constant k.

6. The method of claim 5, wherein the G is obtained through Equation below:

$$G=(Cb_{in}^2+Cr_{in}^2)/(Cb_{max}^2+Cr_{max}^2)$$

wherein $Cb_{in}$ denotes Cb value of the converted YCbCr data, and $Cr_{in}$ denotes Cr value of the converted YCbCr data.

7. The method of claim 6, wherein the constant k is obtained through Equation below:

$$\operatorname{argmax}_k \begin{bmatrix} R_0 \\ G_0 \\ B_0 \end{bmatrix} = \begin{bmatrix} 1 & 0 & 1.402 \\ 1 & -0.344 & -0.714 \\ 1 & 1.772 & 0 \end{bmatrix} \begin{bmatrix} Y_{in} \\ k \times Cb_{in} \\ k \times Cr_{in} \end{bmatrix}$$

$$\text{s.t.} \begin{cases} 0 \le R_0, G_0, B_0 \le 255 \\ 1 \le k \end{cases}$$

wherein $Y_{in}$ denotes Y value of the converted YCbCr data.

8. A display apparatus comprising a display panel comprising a plurality of pixels including R, G, B, and W sub-pixels, the display apparatus comprising:

an image receiver configured to receive image data; and a controller configured to convert RGB data included in the received image data into RGBW data and drive the display panel based on the converted RGBW data, wherein the controller converts the RGB data into YCbCr data and obtains a W value of the RGBW data based on a Y value of the converted YCbCr data, and wherein the W value is the Y value of the converted YCbCr data or a value obtained by applying the Y value to a predetermined contrast enhancement algorithm.

9. The display apparatus of claim 8, wherein the controller identifies RGB values of the RGBW data based on the converted YCbCr data.

10. The display apparatus of claim 8, wherein the predetermined contrast enhancement algorithm comprises a histogram equalization or a sigmoid function.

11. The display apparatus of claim 9, wherein the controller obtains $YCb_{out}Cr_{out}$ data by applying weights to Cb value and Cr value of the converted YCbCr data and identifies RGB values of the RGBW data based on the obtained $YCb_{out}Cr_{out}$ data.

12. The display apparatus of claim 11, wherein $Cb_{out}$ and $Cr_{out}$ values of the $YCb_{out}Cr_{out}$ are obtained through Equation below:

$$Cb_{out}=(1-G)Cb_{in}+G\cdot Cb_{max}$$

$$Cr_{ut}=(1-G)Cr_{in}+G\cdot Cr_{max}$$

wherein, G denotes a weight calculated obtained through a monotone enhancement function, $Cb_{max}$ denotes a product of Cb value of the converted YCbCr data and constant k, and $Cr_{max}$ denotes a product of Cr value of the converted YCbCr data and the constant k.

13. The display apparatus of claim 12, wherein the G is calculated through Equation below:

$$G=(Cb_{in}^2+Cr_{in}^2)/(Cb_{max}^2+Cr_{max}^2)$$

wherein $Cb_{in}$ denotes Cb value of the converted YCbCr data, and $Cr_{in}$ denotes Cr value of the converted YCbCr data.

14. The display apparatus of claim 13, wherein the constant k is obtained through Equation below:

$$\operatorname{argmax}_k \begin{bmatrix} R_0 \\ G_0 \\ B_0 \end{bmatrix} = \begin{bmatrix} 1 & 0 & 1.402 \\ 1 & -0.344 & -0.714 \\ 1 & 1.772 & 0 \end{bmatrix} \begin{bmatrix} Y_{in} \\ k \times Cb_{in} \\ k \times Cr_{in} \end{bmatrix}$$

$$\text{s.t.} \begin{cases} 0 \le R_0, G_0, B_0 \le 255 \\ 1 \le k \end{cases}$$

wherein $Y_{in}$ denotes Y value of the converted YCbCr data.

15. A non-transitory computer readable recording medium storing a program for performing a method of driving a display panel comprising a plurality of pixels including R, G, B, and W sub-pixels, wherein the method comprises:

receiving image data;

converting RGB data included in the received image data into RGBW data; and driving the display panel based on the converted RGBW data, wherein the converting comprises converting the RGB data into YCbCr data and obtaining a W value of the RGBW data based on a Y value of the converted YCbCr data, wherein the W value is the Y value of the converted YCbCr data or a value obtained applying the Y value to a predetermined contrast enhancement algorithm.

* * * * *